United States Patent Office 2,815,341
Patented Dec. 3, 1957

2,815,341
PROCESS FOR RECOVERY OF RIBOFLAVIN

Julian K. Dale, Terre Haute, Ind., assignor to Commercial Solvents Corporation, Terre Haute, Ind., a corporation of Maryland No Drawing. Application May 11, 1955,
Serial No. 507,715

5 Claims. (Cl. 260—211.3)

My invention relates to a process for the recovery of riboflavin and more particularly it relates to a method for obtaining crystalline riboflavin from a precipitated reduced form of riboflavin.

The most common crystalline form of riboflavin is that described in U. S. Patent 2,603,633 as type A and it has been recovered in the past by a number of different methods. One of the prior methods consisted essentially of first extracting a riboflavin-containing material with a suitable solvent, followed by adsorption of the riboflavin contained in the extract on a suitable adsorbent. The riboflavin was then eluted from the adsorbent with an eluting agent, the eluate concentrated and the riboflavin contained therein crystallized.

U. S. Patent 2,367,644 and U. S. Patent 2,367,646 describe a process for recovery of riboflavin from riboflavin-containing solutions by treating the riboflavin-containing solution with a chemical reducing agent capable of producing a measured potential in the riboflavin solution of between about −0.250 and −0.600 volt as determined with the calomel half-cell at 22° C. Under these conditions, precipitation is effected by converting the dissolved riboflavin into a less soluble substance of unknown structure. This less soluble material is designated as a riboflavin precursor.

The riboflavin precursor can also be obtained by the method of U. S. Patent 2,387,023 wherein a riboflavin-containing nutrient mash is inoculated at a predetermined pH with an active culture of bacteria capable of producing the desired precipitate, i. e. the riboflavin precursor from which riboflavin can subsequently be secured.

U. S. Patent 2,421,142 describes a method for converting the riboflavin precursor which can be obtained by the method of any of the three above-mentioned patents, into riboflavin in the crystalline form. According to the process of the latter patent, the crude, reddish-brown riboflavin precursor is placed in a solvent capable of dissolving the same, the mixture being then heated to aid solution of the crude precursor and upon such treatment the precipitate is substantially completely dissolved with the exception of the inert material present therein. The inert material is then removed by filtration or any other convenient means and the remaining solution cooled to obtain yellow needle-like crystals of riboflavin. The particular solvent for the riboflavin precursor employed is a polar solvent in which the precursor is more soluble than riboflavin.

In the above-described processes, the filtration required to remove the riboflavin precursor after precipitation thereof is usually quite difficult and requires an extended period of time. Furthermore, redissolving of the riboflavin precursor in the solvent from which the crystalline riboflavin is subsequently obtained is usually incomplete and the filtration required to remove the insoluble, inert material from the riboflavin precursor solution also difficult and usually slow. In addition, considerable amount of riboflavin is lost in the process.

I have now discovered a new process for recovery of riboflavin from solutions containing the same whereby two difficult filtrations are eliminated as well as a considerable proportion of the loss resulting from removal of the precursor and subsequent redissolving thereof. My new process is relatively simple, economical, and can be carried out in much less time than that previously required.

My new process consists essentially of precipitating a riboflavin precursor from a riboflavin-containing solution, including aqueous nutrient media in which riboflavin is produced by fermentation, by addition of a reducing agent capable of producing a potential in the riboflavin solution of between about −0.250 and −0.600 volt, as determined with the calomel half-cell at 22° C. as described in U. S. Patents 2,367,644 and 2,367,646, mentioned above, or by addition of certain types of reducing bacteria as described in U. S. Patent 2,387,023, also described above. The precipitated riboflavin precursor is permitted to settle and the supernatant then decanted therefrom following which the riboflavin precursor is then partially oxidized with a suitable oxidizing agent, the partial oxidation being carried out to an extent sufficient to cause coagulation and further settling of the partially oxidized riboflavin precursor. After further settling of the partially oxidized riboflavin takes place, a second supernatant is decanted to obtain a second settled slurry. The second settled slurry is then boiled with the addition of a further amount of oxidizing agent to crystallize an excellent quality of type A riboflavin.

As indicated above, I add a reducing agent capable of precipitating the riboflavin precursor to a riboflavin-containing solution. The reducing agent, as described in U. S. Patent 2,367,644 and U. S. Patent 2,367,646 is one capable of producing a measured potential in the riboflavin solution of between about −0.250 and −0.600 volt as determined with the calomel half-cell at 22° C. Specific examples of reducing agents capable of producing a potential within the desired range are compounds that furnish the following ions: $S_2O_4^=$, $Sn^{++}$, $Ti^{+++}$, $Cr^{++}$, and $V^{++}$. Compounds which furnish such ions and which are soluble in riboflavin solutions of the type contemplated include titanium trichloride, stannous chloride, sodium hydrosulfite, hypovanadous sulfate, hypovanadous chloride, chromous chloride, chromous sulfate, etc. Upon addition of the reducing agent, a reddish-colored precipitate forms immediately.

The precipitated riboflavin precursor, obtained as described above, is permitted to settle and the supernatant then decanted. Ordinarily the precursor settles completely leaving a supernatant which is quite clear.

Following removal of the supernatant from the settled riboflavin precursor, the settled slurry is then treated with an oxidizing agent to partially oxidize the riboflavin precursor. Only sufficient oxidizing agent should be added to cause a visual change in the appearance of the slurry which change consists in a transition from a slurry of finely divided particles to one in which the particles have coalesced or coagulated and show a tendency to settle. This transition is accompanied by color change from reddish brown through dark green to a slightly yellowish green. If too much oxidizing agent is added, the slurry becomes quite yellow while settling is slower and incomplete. In carrying out this step of my new process, I employ a hypochlorite type oxidizing or bleaching agent wherein the chlorine in the molecule is attached either to oxygen or nitrogen such as, for example, sodium hypochlorite, sodium p-toluene-sulfochloramine, etc. In carrying out my new process, I prefer to add an amount of oxidizing agent such that the amount of available chlorine added is about 10% by weight of the amount of riboflavin present in the starting riboflavin-containing solution.

Following partial oxidation of the riboflavin precursor resulting in further settling of the precursor, I decant the supernatant leaving a second settled slurry of partially oxidized riboflavin precursor. Further oxidation is required to convert the partially oxidized riboflavin precursor to riboflavin and to accomplish this, the slurry is brought to a boil and a further quantity of the oxidizing agent is added. The amount of oxidizing agent which I add is such that the suspended solids dissolve giving a dark brown solution which gradually becomes a clear, dark red as additional oxidizing agent is added. I prefer to add an amount such that the clear dark red solution is obtained and I have found that when I have added that amount such that the available chlorine equals about 3% by weight of the riboflavin present in the starting riboflavin-containing solution, I can obtain the desired clear dark red solution.

As indicated, the second settled slurry of partially oxidized riboflavin precursor is boiled along with the addition of a further amount of oxidizing agent. The boiling step is necessary to obtain the long, silky needle type of crystalline riboflavin characteristic of type A riboflavin. Usually a five-minute boiling time is sufficient for the desired conversion and I have found that the riboflavin crystallizes from the hot solution if the solution is seeded with previously obtained type A riboflavin crystals.

The product which is obtained by my new process is of high purity generally assaying above about 90% pure riboflavin. The purity of the product can be further increased by recrystallizing the riboflavin according to known methods. For example, I prefer to dissolve the riboflavin in alkali, acidify the solution, then boil it and seed it so as to cause separation of essentially pure riboflavin crystals. By employing my new process and the above recrystallization procedure, I am able to obtain riboflavin of U. S. P. grade (98% pure) with one recrystallization.

The following examples are offered to illustrate my invention; however, I do not intend to be limited to the specific procedures, proportions, or materials set forth. Rather, I intend to include within the scope of my invention all equivalents obvious to those skilled in the art. For example, it will be obvious to those skilled in the art that the decantate from the second settled slurry and the filtrate from which the crystalline riboflavin is removed may contain recoverable amounts of riboflavin sufficient to warrant recycling to the beginning of the process. I have found that such is the case and I prefer and intend to include in my new process the step of recycling the decantate from the second settled slurry and the filtrate from which the crystalline riboflavin product is removed to the beginning of the process, adding same to the riboflavin-containing solution which is the starting material.

*Example 1*

A 7.5-liter portion of a riboflavin solution containing 912 mgs. of riboflavin per liter was treated with sodium hydrosulfite in an amount equal to 70% by weight of the riboflavin present in the solution. A reddish colored precipitate immediately formed. The thin slurry was allowed to settle overnight and the supernatant was then decanted. The decantate amounted to 85% of the original volume of the riboflavin-containing solution and contained 66 mgs. of riboflavin per liter. To the settled slurry was then added 5.2 grams of sodium p-toluene-sulfochloramine causing the particles in the settled slurry to change from a reddish color to a yellow-green color and at the same time to coagulate and settle further. After standing overnight, the supernatant amounting to 12% of the original volume of the riboflavin-containing solution was decanted. This decantate contained 876 mgs. of riboflavin per liter. To the remaining slurry was added 1.6 grams of sodium p-toluene-sulfo-chloramine and the slurry then boiled for five minutes. This procedure resulted in a solution which upon seeding yielded 5.4 grams of crystalline type A riboflavin of 97.6% purity. The yield of crystalline type A riboflavin amounted to 77% of the riboflavin in the starting solution.

*Example II*

The process of Example I was repeated except that sodium hypochlorite was substituted for sodium p-toluene-sulfo-chloramine in the treatment of the first settled slurry to partially oxidize the same and cause it to settle further. A total of 6.2 grams of type A riboflavin crystals of 97.3% purity were obtained for a yield of 83% based on the amount of riboflavin in the starting solution.

Now having described my invention, what I claim is:

1. A process for the recovery of riboflavin from a riboflavin-containing solution which comprises precipitating a riboflavin precursor by addition of a reducing agent to the filtered fermentation medium, allowing the precipitated riboflavin precursor to settle and decanting the supernatent therefrom, partially oxidizing the riboflavin precursor to an extent sufficient to cause coagulation and further settling of the yellowish-green partially oxidized riboflavin precursor particles, decanting the supernatant fluid to leave a slurry of partially oxidized riboflavin precursor, boiling the slurry and further oxidizing the partially oxidized riboflavin precursor to form a dark red solution and crystallizing type A riboflavin therefrom.

2. A process for the recovery of riboflavin from a riboflavin-containing solution which comprises adding a reducing agent to the riboflavin-containing solution to precipitate a riboflavin precursor, allowing the precipitate to settle and decanting the supernatant therefrom, adding an amount of oxidizing agent to the precursor slurry sufficient to cause coagulation and further settling of the partially oxidized riboflavin precursor particles, decanting the supernatant fluid to leave a slurry of partially oxidized riboflavin precursor, adding additional oxidizing agent to the riboflavin precursor slurry, boiling the mixture to form a solution of riboflavin and crystallizing type A riboflavin therefrom.

3. A process for recovery of riboflavin from a riboflavin-containing solution which comprises adding to the riboflavin-containing solution a reducing agent capable of furnishing ions selected from the class consisting of $S_2O_4^=$, $Cr^{++}$, $V^{++}$, $Ti^{+++}$, and $Sn^{++}$ to precipitate a riboflavin precursor, allowing the precipitate to settle and decanting the supernatant therefrom, adding to the settled slurry a hypochlorite type oxidizing agent in an amount sufficient to cause coagulation and further settling of the partially oxidized riboflavin precursor particles, decanting the supernatant, boiling the resulting slurry and adding an additional amount of oxidizing agent sufficient to cause formation of a dark red solution of the oxidized riboflavin precursor and crystallizing type A riboflavin therefrom.

4. The process of claim 3 wherein the boiling dark red solution of oxidized riboflavin precursor is seeded to crystallize type A riboflavin therefrom.

5. A process for the recovery of riboflavin from a riboflavin-containing solution which comprises adding sodium hydrosulfite to the riboflavin-containing solution to precipitate a riboflavin precursor, allowing the riboflavin precursor to settle and decanting the supernatant therefrom, adding an amount of sodium hypochlorite sufficient to cause coagulation and further settling of the partially oxidized riboflavin precursor particles, decanting the supernatant, boiling the resulting slurry of partially oxidized riboflavin precursor particles, adding to the boiling slurry an amount of sodium hypochlorite sufficient to cause solution of the oxidized riboflavin precursor particles to form a dark red solution, and seeding the solution to crystallize type A riboflavin crystals therefrom.

References Cited in the file of this patent

UNITED STATES PATENTS

| | | |
|---|---|---|
| 2,367,646 | McMillan | Jan. 16, 1945 |
| 2,464,243 | Legg et al. | Mar. 15, 1949 |